Figure 1:
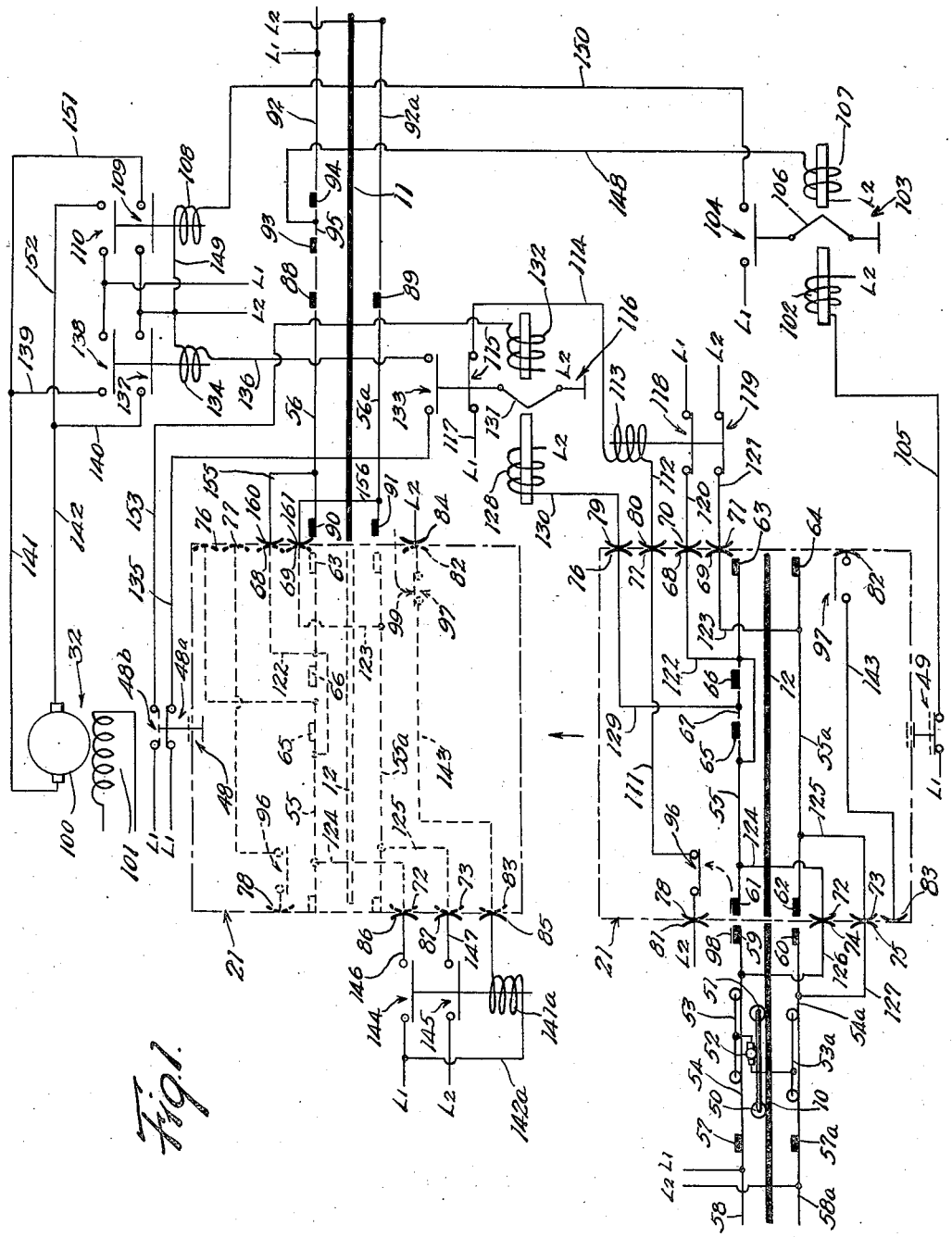

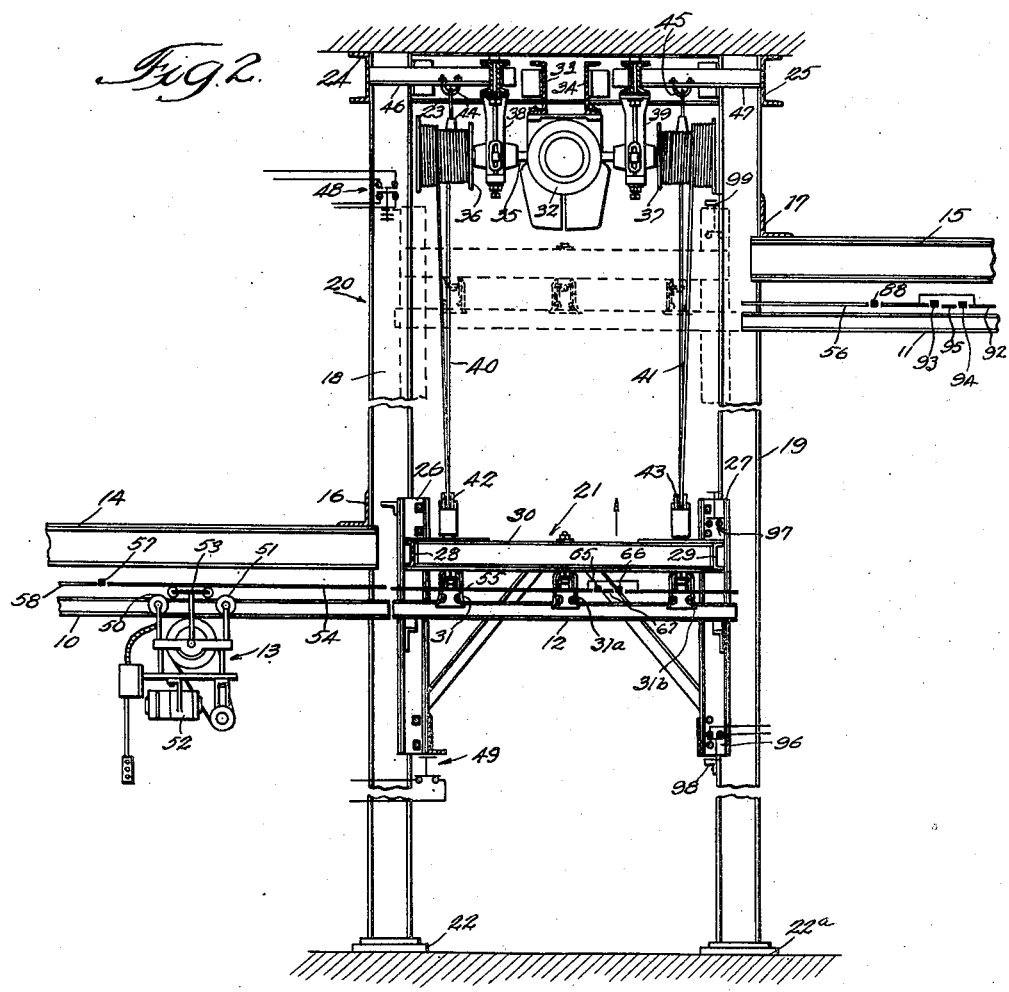

Patented Oct. 25, 1949

2,486,222

UNITED STATES PATENT OFFICE 2,486,222

CONVEYER APPARATUS AND CONTROL SYSTEMS THEREFOR

Ralph W. Spafford, Fairfield, Iowa, assignor to The Louden Machinery Company, Fairfield, Iowa, a corporation of Iowa Application May 5, 1945, Serial No. 592,245

12 Claims. (Cl. 104—128)

1

This application relates to conveyor apparatus and control systems therefor, more particularly to conveyor control systems for effecting the transfer of a conveyor moving on one trackway to another trackway and it is an object of the invention to provide an improved conveyor control system of the character indicated.

High speed production methods in modern industrial plants make it paramount that material used in the manufacturing processes, the partially completed product and the finished product be moved rapidly from one point to another in order to have material available at all times and to remove the products to prevent congestion. High speed conveyor systems of the overhead monorail type are one well known means for bringing about the rapid movements. The production of a completed article from raw materials is a complex process requiring numerous operations performed in a specified order, the requirements of each operation frequently being so different in character that it must be carried on in a different part of the manufacturing plant. This of course requires at least one conveyor trackway running from a main conveyor trackway to the point of operation and one returning from it to the main trackway. Furthermore, the economical use of personnel requires that the personnel work in a relatively small area thereby avoiding the spending of considerable amounts of time moving from place to place. The materials must therefore be brought to the point where each person is working and the resulting product must be moved away. This necessitates at least one trackway extending from the main trackway to each working point.

It thus becomes evident that conveyor systems of the character needed become exceedingly complex, requiring large numbers of trackways which must be joined together and integrated into a complete system in which the trackways extend in different directions from each other are displaced from each other and extend at different elevations, all of which requires numerous changes of direction of movement of a conveyor.

To bring about the changes of direction on trackways at one elevation or the changes in elevation it is well known to use a transfer or movable trackway section registering with one trackway to allow a conveyor to move onto the transfer trackway which is thereafter moved into registry with another trackway to permit the conveyor to move off of the transfer trackway and onto the other trackway. In such well known installations the transfer trackways have

2 been hand controlled in that an operator must control the transfer trackway whenever a conveyor comes along. This causes the conveyors to be delayed, move slowly and leads to congestion. Accordingly, it is a further object of the invention to provide an improved control system for a movable or transfer trackway in which the transfer trackway is automatically controlled to move from one position to another.

It is a further object of the invention to provide an improved automatic control system for a transfer trackway responsive to the presence of a conveyor on the transfer trackway for moving the transfer trackway from one position to another.

It is a further object of the invention to provide an improved automatic control system for a transfer trackway controlled by a conveyor moving on the trackway for moving the transfer trackway from one position to another with the conveyor on it and to return the transfer trackway to its first position after the conveyor has moved off of the transfer trackway.

In carrying out the invention in one form, a conveyor system is provided having a first trackway at one level, a second trackway at another level and an elevator trackway movable between two positions to come into registry with either of the trackways. Bus bar means extend alongside the respective trackways for supplying power to a conveyor to move a conveyor from the first trackway onto the elevator trackway and from the elevator trackway onto the second trackway. To raise or lower the elevator trackway between the two positions, power means are provided along with control means responsive to the presence of the conveyor on the elevator trackway while in registry with the first trackway for causing the power means to move the elevator trackway into registry with the second trackway. Additional control means are arranged on the second trackway so that when the conveyor moves from the elevator trackway and onto the second trackway the power means are actuated to return the elevator into registry with the first trackway.

For a more complete understanding of the invention, reference is made to the accompanying drawings, in which:

Fig. 1 is a schematic view of conveyor apparatus and a control system therefor embodying the invention; and Fig. 2 is a sectional elevational view of a conveyor elevator with the conveyor trackways extending from it at different levels shown schematically in Fig. 1.

Referring to Fig. 2 of the drawings, the invention is shown embodied in a monorail conveyor system including a trackway 10 at one elevation, a trackway 11 at a higher elevation, an elevator trackway 12 which is movable from a position registering with the trackway 10 to a position (shown dotted) registering with the trackway 11 and a conveyor 13 movable on the respective trackways. The trackways 10 and 11 are suitably supported by means including the beam members 14 and 15 attached, respectively, at their inner ends to the horizontal beams 16 and 17 which in turn are attached, respectively, to the vertical columns 18 and 19 of the elevator framework 20.

The elevator framework 20 guides and supports an elevator section or lift section 21 in its vertical movements and includes four vertical columns arranged at the corners of a square or rectangle of which the vertical columns 18 and 19, as shown, form one side extending parallel to the beams 14 and 15. The vertical columns 18 and 19 are supported on foundation members 22 and 22a, extend to the necessary height and are rigidly joined at their upper ends by the beam member 23. Also rigidly joined at one end to the vertical columns 18 and 19 extending at right angles to the beam member 23 are the beam members 24 and 25, respectively, which are rigidly joined at their other ends to the vertical columns forming the other side of the square or rectangle to complete the elevator framework. The beam members 16 and 17 are rigidly attached to and extend between the vertical columns on the sides of the square or rectangle corresponding, respectively, to the vertical columns 18 and 19 and the beam members 14 and 15 are centrally supported between the vertical columns on each side of the rectangle or square by the beam members 16 and 17, respectively. The various beams are attached to each other by means of rivets, welding or any other well known means.

The elevator section or lift 21 including the elevator trackway 12 is arranged within the elevator framework 20 and has sliding members also arranged at the four corners of a square or rectangle to slidably engage, respectively, each of the vertical columns. In the drawing only the slide members 26 and 27 associated, respectively, with the vertical columns 18 and 19 are shown. Extending between the slide members on the sides of the elevator section 21 corresponding to the slide members 26 and 27 are the beam members 28 and 29 which support a beam member 30 centrally between them. The slide members and the several beam members form a rigid structure which is guided in its vertical movements by the vertical columns. Mounted on the beam member 30 are the vertical hangers 31, 31a and 31b which support the elevator trackway 12 so that in the position shown the trackways 10 and 12 are in registry and in the raised position (shown dotted) the trackways 12 and 11 are in registry.

At the upper end of the elevator framework 20 a motor 32 for raising and lowering the elevator section 21 is supported by means shown as the channel members 33 and 34 attached at one end to the beam member 23 by any well known means such as welding and similarly attached at the other end to a beam member corresponding to the beam member 23. The motor 32 drives a shaft 35 through a gear box (not shown) and drums 36 and 37 are attached, respectively, to the ends of the shaft, the shaft being supported by the vertical hangers 38 and 39. Wrapped around the drums 36 and 37 are cables 40 and 41, respectively, which cables extend respectively around pulleys 42 and 43 attached to the beam 30, the ends of the cables being attached through the U bolts 44 and 45 to the angle members 46 and 47 which are rigid with the beam members 24 and 25, respectively. Operating the motor 32 in one direction turns the shaft 35 and consequently the drums 36 and 37 thereby wrapping the cables 40 and 41 around the drums and by virtue of the structure described the elevator section 21 is raised to bring the elevator trackway 12 into registry with the trackway 11. Rotating the motor in the other direction lowers the elevator section 21 to bring the elevator trackway 12 into registry with the trackway 10. Limit switches 48 and 49 are stationarily mounted on the elevator framework 20 and are actuated by the elevator section 21 to control the position of the trackway 12. The circuits to the limit switch contacts and the circuits to control the motor operation will be described subsequently in this specification.

The conveyor 13 is shown somewhat schematically as including trolley wheels 50 and 51 adapted to run on the monorail trackways, the trolley wheels 50 and 51 supporting the conveyor. The conveyor also includes a driving motor 52 and the current collectors or trolleys 53 and 53a (Fig. 1), each of the current collectors 53 and 53a comprising a pair of spaced wheels adapted to engage the bus bars extending alongside the various trackways. Power is supplied to the driving motor 52 from the bus bars through the current collectors, the bus bars being insulated from the trackways and supported in proper relation thereto by well known means not illustrated.

The conveyor apparatus shown in Fig. 2 and described with reference thereto is illustrated schematically along with the control system for the conveyor and the elevator section in Fig. 1, corresponding elements being designated by the same reference characters.

Extending alongside of the lower trackway 10 are the bus bar sections 54 and 54a insulated from the trackway 10 and suitably supported in connection therewith to receive the trolleys 53 and 53a of the conveyor 13. The bus bar sections 54 and 54a are insulated at one end by the insulators 57 and 57a from the bus bars 58 and 58a, extending alongside the remaining trackway and are provided at their other ends with the insulators 59 and 60. The bus bars 54 and 54a, combined with the portion of the trackway 10 corresponding thereto, form a dead section so that a conveyor moving on the trackway 10 can move off of the trackway 10 toward the elevator trackway 12 only when the elevator trackway 12 is in registry with the trackway 10.

The elevator section 21 in addition to the elevator trackway 12 includes the bus bars 55 and 55a extending alongside the trackway 12, limit switches to control the supply of power to the bus bars, control circuits, and sliding contacts to coact with stationary sliding contacts to connect the various circuits to external circuits which will be more completely described, the bus bars 55 and 55a having insulators 61 and 62 arranged at one end and insulators 63 and 64 arranged at the other end. In the lowered position where the trackway 12 registers with the trackway 10 the bus bars 55 and 55a are prevented from contacting the bus bar sections 54 and 54a by the insulators 59 and 61 and 60 and 62, respectively, and the bus bars are physically separated by a gap as shown so that the insulators do not contact each other. To stop the conveyor after it has moved onto the elevator trackway 12 the bus bar 55 is interrupted by a control section which includes the insulators 65 and 66 separated by a conductor 67. The operation of the control section will be explained subsequently. To supply power to the bus bars 55 and 55a, when the elevator section is in the lowered position, sliding contacts 68 and 69 are provided on the elevator section which cooperate with sliding contacts 70 and 71 which are stationarily mounted on the elevator framework 20. To conduct the power from the bus bars 55 and 55a to the bus bars 54 and 54a the sliding contacts 72 and 73 are provided on the elevator section 21 to coact with corresponding sliding contacts 74 and 75, also stationarily mounted on the elevator framework 20.

The control circuits on the elevator section 21 which are operative when the elevator section is in the lowered position include the sliding contacts 76, 77 and 78 mounted on the elevator section to coact with the corresponding sliding contacts 79, 80 and 81, respectively, mounted on the elevator framework 20. The sliding contacts 82 and 83 are also mounted on the elevator section 21 but coact with the sliding contacts 84 and 85, respectively, only when the elevator section is in the raised position, the sliding contacts 84 and 85 being stationarily mounted on the elevator framework. To supply power to the bus bars 55 and 55a when the elevator section 21 is in the raised position the sliding contacts 86 and 87 are mounted on the elevator framework and coact with the sliding contacts 72 and 73 on the elevator section.

Similarly to the trackway 10 the trackway 11 has bus bar sections 56 and 56a associated therewith. The bus bar sections are insulated at one end by the insulators 88 and 89 from the bars 92 and 92a which extend along the remaining portion of the trackway 11 and have insulators 90 and 91 arranged at their other ends so that the bus bars 55 and 55a do not contact directly the bus bars 56 and 56a when the elevator section is in the raised position and the bus bars are physically separated by a gap as shown. The bus bars 56 and 56a, along with the portion of the trackway 11 corresponding thereto, form a dead section which is unenergized unless the elevator trackway 12 is in registry with the trackway 11 (the elevator section is in the raised position). To supply power to the bus bar sections 56 and 56a the elevator framework 20 has the stationary sliding contacts 160 and 161 mounted on it to coact with the sliding contacts 68 and 69, respectively, on the elevator section 21. Forming part of the bus bar 92 and arranged in a position beyond the insulator 88, is a control section which includes the insulators 93 and 94 separated by a conductor 95, the conductor 95 being adapted to be contacted by the trolley collector 53 which energizes a circuit to be described for lowering the trackway 12 from registry with the trackway 11 into registry with the trackway 10. For a more complete description of the control sections, reference is made to the applicant's copending application Serial No. 523,635, filed February 24, 1944, and entitled "Crane construction and apparatus."

Limit switches 96 and 97 are mounted on the elevator section 21 and are adapted to be actuated by suitable abutments, indicated by the broken arrows 98 and 99, on the elevator framework 20 when the elevator section is in either the lowered or raised positions to energize the appropriate bus bars only when the elevator trackway 12 is in registry with the trackway 10 or 11.

The motor 32 is of a type well known in the electrical art and includes an armature 100 and a field 101 which may be excited from any suitable source of current, for example, the same source as is used to supply power to the bus bars. While a direct current motor is shown it is obvious that alternating current motors may be used and it will also be clear to those skilled in this art that alternating current which may be single or multi phase may be used to supply the propulsion motor and other apparatus.

Power is supplied to the various bus bars for supplying power to the conveyor motor 52 in order to move the conveyor to the various control circuits and relays as well as to the raising and lowering motor 32 from a source of power designated by the characters $L_1$ and $L_2$.

The control of the elevator section 21 and the conveyor in connection therewith is entirely automatic and has four phases, the movement of the conveyor onto the elevator trackway, the raising of the elevator trackway, the movement of the conveyor off of the elevator trackway and lowering of the elevator trackway to its original position. The description of the control system and an understanding of the operation of the conveyor system and its control may best be set forth by considering the aspects of the system in each of the four phases indicated above as a conveyor moves over the trackways.

In the first phase of operation the elevator trackway 12 is in its lowered position in registry with the trackway 10 and assuming that the conveyor 13 has not approached that portion of the trackway 10 corresponding to the bus bars 54 and 54a, the following will be the condition of the various circuits. The contacts 48a of the limit switch 48 are closed and the contacts 48b are open. The contacts of the limit switch 49 are closed energizing the coil 102 of the relay 103 to open the contacts 104 through a circuit extending from $L_1$ through limit switch contacts 49, conductor 105, coil 102 to $L_2$. The relay 103 is of the mechanically latched type having an overcenter mechanism 106 and has the opening coil 102 and a closing coil 107. The overcenter device 106 maintains the contacts 104 in either position until the coil for the other position is energized. Since the contacts 104 are open the relay coil 108 is unenergized and the contacts 109 and 110 are open. Consequently the motor armature 100 is unenergized and, therefore, the motor is stationary. The contacts of limit switch 96 are closed by the abutment 98 which completes a circuit extending from $L_2$ through the sliding contacts 81 and 78, contacts of limit switch 96, conductor 111, sliding contacts 77 and 80, conductor 112, relay coil 113, conductor 114, normally closed contacts 115 of relay 116 and conductor 117 to $L_1$. This circuit energizes the relay coil 113 which closes the contacts 118 and 119 and thereby energizes the bus bars 55 and 55a through circuits extending from $L_1$ and $L_2$, relay contacts 118 and 119, conductors 120 and 121, sliding contacts 70, 68 and 71, 69 and conductors 122 and 123 to bus bars 55 and 55a. The bus bars 54 and 54a are thereby energized through circuits extending from bus bars 55 and 55a through conductors 124 and 125, sliding contacts 72, 74 and 73, 75 and conductors 126 and 127 to the bus bars 54 and 54a.

It is seen, therefore, that the bus bars 54 and 54a are energized and the conveyor 13 moving along the trackway 10 will move onto the elevator trackway 12, power being supplied to the conveyor through the trolleys 53 and 53a in contact with the bus bars 54 and 54a, respectively. After the conveyor has moved completely onto the elevator trackway 12, the front wheel of the current collector 53 contacts the control section conductor 67 while the rear wheel thereof remains in contact with the bus bar 54 thereby energizing the relay coil 128 of the relay 116 through a circuit extending from the source $L_1$, bus bar 55, collector 53, control section conductor 67, conductor 129, sliding contacts 76, 79, conductor 130 and relay coil 128 to $L_2$. Energizing the coil 128 causes the relay 116 to open its contacts 115 thereby interrupting the current to the relay coil 113 and consequently opening the contacts 118 and 119 which disconnects the bus bars 55 and 55a from the source $L_1$ and $L_2$. Since the power is now removed from bus bars 55 and 55a, the conveyor stops and since the bus bars 54 and 54a are connected to the bus bars 55 and 55a these bus bars are also now deenergized and, therefore, any other conveyor approaching the trackway 12 will be stalled on the dead section corresponding to the bus bars 54 and 54a.

The first phase of the operation is now complete and the second phase begins.

Similarly to relay 103 the relay 116 is a mechanically latched relay and is maintained by the overcenter device 131 in whatever position it is actuated to by either of its coils 128 and 132 until a further actuating impulse is received to change the position. When the relay 116 was picked up by energizing the coil 128 through the previously described circuit the contacts 133 also closed. Closing the contacts 133 energizes the coil 134 through the circuit extending from $L_1$, closed limit switch contacts 48a, conductor 135, closed contacts 133, conductor 136 and coil 134 to $L_2$. Energizing the coil 134 closes the contacts 137 and 138 and thereby energizes the motor armature 100 through a circuit extending from $L_1$ and $L_2$, contacts 138 and 137, conductors 139 and 140 and conductors 141 and 142, the motor thereupon operating through mechanism illustrated in Fig. 2 to raise the elevator trackway 12 with the conveyor 13 on it into registration with the trackway 11. This movement of the elevator section 21 opens the contacts of the limit switch 49 and deenergizes the coil 102. The upward movement of the elevator section 21 also opens the limit switch contacts 96 which produces no control effect since these limit switch contacts control the energization of the bus bars 55 and 55a which energization has already been removed.

After the elevator section 21 has reached its position where the trackway 12 is in registry with the trackway 11 (shown dotted) the limit switch contacts 48a are opened and the limit switch contacts 48b are closed. Opening the contacts 48a interrupts the previously described circuit to the relay coil 134 thereby opening the contacts 137 and 138 to deenergize the motor armature 100 which thereby brings the elevator section 21 to a rest, the adjustment of the limit switch 48 being such that the trackways 12 and 11 are in registry. Closing the limit switch contacts 48b energizes the coil 132 of the relay 116 through a circuit extending from $L_1$, contacts 48b, conductor 153 and coil 132 to $L_2$. Energizing coil 132 trips the overcenter mechanism 131 which closes the contacts 115 and opens the contacts 133 thereby conditioning the relay coil 113 so that it can be energized when the elevator section is in the lowered position. This completes the second phase of the operation.

The limit switch contacts 97 which are open in the lowered position of the elevator trackway are closed in the raised position of the elevator section by a stationary projection 99 thereby energizing the relay coil 141a through a circuit extending from $L_1$, conductor 142a, relay coil 141a, sliding contacts 85, 83, conductor 143, limit switch contacts 97 and sliding contacts 82, 84 to $L_2$. Energizing the coil 141a closes the relay contacts 144 and 145 thereby energizing the bus bars 55 and 55a through circuits extending from $L_1$ and $L_2$, contacts 144 and 145, conductors 146 and 147, sliding contacts 86, 72 and 87, 73, conductors 124 and 125 to the bus bars 55 and 55a. The conveyor motor 52 is thus energized through the trolley 53 and the conveyor moves off of the trackway 12 onto the trackway 11. The bus bars 56 and 56a are energized from the bus bars 55 and 55a through circuits extending from the bus bars 55 and 55a, conductors 122 and 123, sliding contacts 68, 160 and 69, 161 and conductors 155 and 156 to the bus bars 56 and 56a. The third phase of the operation is now completed.

The conveyor continues to move over the trackway 11 and the current collecting apparatus contacts the bus bars 92 and 92a until the trolley collector 53 contacts the control section conductor 95 which energizes the relay coil 107 through a circuit extending from $L_1$, bus bar 92, trolley collector 53, control section conductor 95, conductor 148 and coil 107 to $L_2$. Energizing the coil 107 closes contacts 104 of the mechanically latched relay 103 and thereby energizes the relay coil 108 through the circuit extending from $L_2$, conductor 149, coil 108, conductor 150 and contacts 104 to $L_1$. Energizing the coil 108 closes the contacts 109 and 110 thereby energizing the motor armature 100 through circuits extending from $L_2$ and $L_1$, contacts 109 and 110, conductors 151 and 152 and conductors 141 and 142 to the motor armature causing the motor to rotate in the reverse direction to lower the elevator trackway 12 from registry with trackway 11 to registry with trackway 10.

As the elevator section 21 moves downward, the limit switch contacts 97 are opened to deenergize the coil 141a which opens the contacts 144 and 145 and thereby removes the power from the bus bars 55 and 55a, as well as the bus bars 56 and 56a. The lowering movement of the elevator section 21 also closes the limit switch contacts 48a and opens the limit switch contacts 48b thereby deenergizing the coil 132.

When the elevator section reaches its lowered position the limit switch contacts 49 are closed thereby energizing the relay coil 102 to trip the overcenter mechanism 106 and open the relay contacts 104. Opening the contacts 104 deenergizes the coil 108 which in turn opens the contacts 109 and 110 to deenergize the motor armature 100 thereby stopping the conveyor movement, the limit switch contacts 49 being so adjusted that they are closed when the trackways 12 and 10 are in registry. The lowering movement also closes the limit switch contacts 96 which energizes the coil 113 through a circuit previously described to close the relay contacts 118 and 119 for supplying power to the bus bars 55 and 55a and 54 and 54a and the system is ready for another cycle of operation.

It is to be noted that the bus bars 56 and 56a are insulated from the bus bars 92 and 92a and are energized only when the elevator section is in the raised position and thus conveyors are prevented from moving toward the elevator section 21 on the trackway 11. In order to prevent the interruption of power flow from the bus bars to the motor 52 when the trolley 53 strikes the control section, the spacing of the trolley wheels is sufficiently long so that the trolley can span over the control section and contact the bus bar on each side.

While a particular embodiment of the invention has been shown it will be understood, of course, that the invention is not limited thereto since many modifications may be made, and it is, therefore, contemplated by the appended claims to cover any such modifications as come within the true spirit and scope of the invention.

Having thus described the invention, what is claimed and desired to be secured by Letters Patent is:

1. A conveyor system comprising an elevator, a first trackway at one level, a second trackway at another level, a trackway carried by said elevator between two positions to come into registry with said first or second trackways, power means for raising and lowering said elevator trackway between said two positions, bus bar means individual to each of said trackways and extending therealong to supply power to a conveyor for moving said conveyor along said trackways, power supply means for said bus bar means, means controlled by said elevator for connecting said power supply to the bus bar means individual to said elevator trackway and the one of said first or second trackways respectively only when said elevator trackway is in registry with said one of said first or second trackways, means responsive to the presence of a conveyor on said elevator trackway while in registry with said first trackway at one level for controlling said elevator controlled means to deenergize the bus bar means individual to said elevator trackway whereby a conveyor will be stopped on said elevator trackway, said responsive means also being effective to control said power means to move said elevator trackway into registry with said second trackway at another level and additional control means responsive to the passage of a conveyor from said elevator trackway and over said second trackway for causing said power means to move said elevator trackway into registry with said first trackway.

2. A conveyor system comprising an elevator, a first trackway at one level, a second trackway at another level, a trackway carried by said elevator between two positions to come into registry with said first or second trackways, power means for raising and lowering said elevator trackway between said two positions, bus bar means individual to each of said trackways and extending therealong to supply power to a conveyor for moving said conveyor along said trackways, power supply means for said bus bar means, means controlled by said elevator for connecting said power supply to the bus bar means individual to said elevator trackway and said first or second trackways only when said elevator trackway is in registry with said first or second trackways, means responsive to the presence of a conveyor on said elevator trackway while in registry with said first trackway at one level for controlling said elevator controlled means to deenergize the bus bar means individual to said elevator trackway whereby a conveyor will be stopped on said elevator trackway, said responsive means also being effective to control said power means to move said elevator trackway toward said second trackway, means for deenergizing said power means when said elevator trackway comes into registry with said second trackway at said other level, additional control means responsive to the passage of a conveyor from said elevator trackway and over said second trackway for causing said power means to move said elevator trackway toward said first trackway, and means for deenergizing said power means when said elevator trackway comes into registry with said first trackway at said one level.

3. A conveyor system comprising an elevator, a first trackway at one level, a second trackway at another level, a trackway carried by said elevator between two positions to come into registry with said first or second trackways, power means for raising and lowering said elevator trackway between said two positions, bus bar means insulated from each other and individual to each of said trackways to supply power to a conveyor for moving said conveyor along said trackways, power supply means for said bus bar means, means controlled by said elevator for connecting said power supply to the bus bar means individual to said elevator trackway and to said first trackway only when said elevator trackway is in registry with said first trackway, means responsive to the presence of a conveyor on said elevator trackway while in registry with said first trackway at one level for controlling said elevator controlled means to deenergize the bus bar means individual to said elevator trackway and said first trackway whereby a conveyor will be stopped on said elevator trackway, said responsive means also being effective to control said power means to move said elevator trackway toward said second trackway, means for deenergizing said power means when said elevator trackway comes into registry with said second trackway at said other level, means controlled by said elevator for connecting said power supply to the bus bar means individual to said elevator trackway and said second trackway only when said elevator trackway is in registry with said second trackway, additional control means responsive to the passage of a conveyor from said elevator trackway and over said second trackway for causing said power means to move said elevator trackway toward said first trackway, and means for deenergizing said power means when said elevator trackway comes into registry with said first trackway at said one level.

4. A travelling conveyor system comprising an elevator, a first trackway section carried thereby, bus bar means including an insulated first bus bar section extending alongside said trackway section and carried by said elevator, an entrance second trackway section on one level with which said first trackway is alignable, bus bar means including an insulated second bus bar section extending alongside said second trackway section, an exit third trackway section on a different level with which said first trackway section is alignable, bus bar means including an insulated third bus bar section extending alongside said third trackway section, power hoist means for controlling the raising and lowering of said elevator, an electric power supply for said bus bars, a conveyor designed to travel from said second trackway onto said first trackway when these trackways are in alignment and from said first trackway onto said third trackway when these trackways are in alignment, an electric motor carried by said conveyor for propelling it, collector means carried by said conveyor for successively engaging said three bus bar sections, means for automatically electrically connecting said first and second bus bar sections with said power supply when said first trackway is in alignment with said second trackway to enable the conveyor to move from the second trackway onto the first trackway, means controlled by said conveyor for automatically electrically disconnecting said first and second bus bar sections from said power supply and energizing the hoist means to move the elevator from said first level to said second level when the conveyor has travelled onto the first trackway, means controlled by the elevator for automatically electrically connecting said first bus bar section with the power supply and for stopping the power hoist means when the second level is reached to enable the conveyor to move from said first trackway onto said third trackway and for conditioning the power supply circuit to energize the first bus bar section and the second bus bar section when the elevator shall be returned to said first level, and means controlled by the conveyor for causing the hoist means to move the elevator from said second level to said first level when the conveyor has travelled onto said third trackway.

5. A conveyor system comprising an elevator, a first trackway at one level, a second trackway at another level, a trackway carried by said elevator between two positions to come into registry with said first or second trackways, power means for raising and lowering said elevator trackway between said two positions, bus bar means individual to each of said trackways and extending therealong to supply power to the propulsion motor of a conveyor for moving thereof along said trackways, and means independent of elevator trackway movement responsive to the movement of a conveyor onto said elevator trackway at one of its positions for effecting deenergization of said conveyor propulsion motor, said responsive means also being effective when said conveyor is on said elevator trackway for automatically energizing said power means for moving said elevator trackway to the other of its positions.

6. A conveyor system comprising an elevator, a first trackway at one level, a second trackway at another level, a trackway carried by said elevator between two positions to come into registry with said first or second trackways, power means for raising and lowering said elevator trackway between said two positions, bus bar means individual to each of said trackways and extending therealong to supply power to the propulsion motor of a conveyor for moving thereof along said trackways, and means independent of elevator trackway movement responsive to the movement of a conveyor onto said elevator trackway at one of its positions for effecting deenergization of said bus bar means individual to said elevator trackway thereby to stop said conveyor movement, said responsive means also being effective when said conveyor is on said elevator trackway for automatically energizing said power means for moving said elevator trackway to the other of its positions.

7. A conveyor system comprising an elevator, a first trackway at one level, a second trackway at another level, a trackway carried by said elevator between two positions to come into registry with said first or second trackways, power means for raising and lowering said elevator trackway between said two positions, bus bar means individual to each of said trackways and extending therealong to supply power to the propulsion motor of a conveyor for moving thereof along said trackways, and means independent of elevator trackway movement responsive to the movement of a conveyor onto said elevator trackway at one of its positions for effecting de-energization of said bus bar means individual to said elevator trackway thereby to stop said conveyor movement, said responsive means also being effective when said conveyor is on said elevator trackway for automatically energizing said power means to move said elevator trackway to the other of its positions, and additional control means responsive to the passage of the conveyor from said elevator trackway and over the trackway at said other position for causing said power means to move said elevator trackway back into said one of its positions.

8. A conveyor system comprising a first trackway, a second trackway displaced from said first trackway, an intermediate trackway movable between first and second positions to come into registry with said first or second trackways respectively, power means for moving said intermediate trackway between said positions, bus bar means individual to each of said trackways and extending therealong to supply power to the propulsion motor of a conveyor for moving said conveyor along said trackways, power supply means for said bus bars, means independent of elevator trackway movement responsive to the movement of a conveyor onto said intermediate trackway at the first of its positions for effecting disconnection of the power supply from said intermediate trackway bus bars, said responsive means also being effective when said conveyor is on said intermediate trackway for automatically effecting energization of said power means to move said intermediate trackway to the second of its positions, means responsive to the movement of said intermediate trackway into registry with said second trackway at said second position for automatically connecting said power supply to said intermediate trackway bus bars thereby energizing said propulsion motor to move the conveyor off of said intermediate trackway, and means associated with said second trackway responsive to the passage of a conveyor therealong from said intermediate trackway for causing said power means to move said intermediate trackway back into registry with said first trackway.

9. A conveyor system comprising a first trackway, a second trackway displaced therefrom, an intermediate trackway movable between first and second positions to come into registry with said first or second trackways respectively, power means for moving said intermediate trackway between said positions, bus bar means individual to each of said trackways and extending therealong to supply power to the propulsion motor of a conveyor for moving said conveyor along said trackways, power supply means for said bus bars, means controlled by said intermediate trackway for connecting said power supply to the bus bar means individual to said intermediate trackway and the first of said first or second trackways respectively only when said intermediate trackway is in registry with said one of said first or second trackways, means responsive to the movement of a conveyor onto said intermediate trackway while in registry with said first trackway for controlling said intermediate trackway controlled means to de-energize the bus bar means individual to said intermediate trackway whereby a conveyor will be stopped on said intermediate trackway, said responsive means also being effective to control said power means to move said intermediate trackway into registry with said second trackway, and additional control means associated with said second trackway and responsive to the passage of a conveyor therealong from said intermediate trackway for causing said power means to move said intermediate trackway into registry with said first trackway.

10. In a conveyor system, apparatus for controlling movement of a conveyor carrier from one position to another comprising, means for supplying power, first contact means operated by said carrier in one of its positions for controlling said power supply means to supply power to said carrier, second contact means controlled by a conveyor running onto said carrier and independent of carrier movement for controlling said power supply means to remove power from said carrier, and third contact means also controlled by a conveyor running onto said carrier for effecting movement of a carrier with a conveyor thereon from one position to another position.

11. In a conveyor system, apparatus for controlling movement of a conveyor carrier from one position to another comprising, a bus bar on said carrier adapted to be contacted by conveyor collectors, means for supplying power to said bus bar, an insulated control conductor associated with said bus bar, first contact means operated by said carrier in one of its positions for controlling said power supply means to supply power to said bus bar, second contact means operated by a conveyor collector contacting said control conductor for controlling said power supply means to remove power from said bus bar, and third contact means also controlled by said conveyor collector contacting said control conductor for effecting movement of a carrier from one position to another.

12. In a conveyor system, apparatus for controlling movement of a conveyor carrier from one position to another comprising, a bus bar on said carrier, a bus bar preceding said carrier at one position and adapted to come into registry with said carrier bus bar, a bus bar following said carrier at another position and adapted to come into registry with said carrier bus bar, said conveyor including a collector adapted to run on said bus bar, said carrier bus bar having an insulated control conductor associated therewith, said following bus bar having an insulated control conductor associated therewith, first means for supplying power to said carrier bus bar, first contact means operated by said carrier at said one position for controlling said first power supply means to supply power to said carrier bus bar, second contact means operated by said conveyor collector contacting said carrier bus bar control conductor for controlling said first power supply means to remove power from said carrier bus bar, third contact means also controlled by said conveyor collector contacting said carrier bus bar control conductor for effecting movement of said carrier from said one position to said other position, a second power supply means, contact means controlled by said carrier in said other position for controlling said second power supply means to supply power to said carrier bus bar, and contact means controlled by a conveyor collector contacting said following bus bar control conductor for effecting movement of said carrier from said other position to said one position.

RALPH W. SPAFFORD.

REFERENCES CITED

The following references are of record in the file of this patent:

UNITED STATES PATENTS

| Number | Name | Date |
| --- | --- | --- |
| 1,133,734 | Macfadden | Mar. 30, 1915 |
| 1,168,676 | Romer | Jan. 18, 1916 |
| 1,290,687 | Turner | Jan. 7, 1919 |

FOREIGN PATENTS

| Number | Country | Date |
| --- | --- | --- |
| 333,012 | Germany | Feb. 12, 1921 |